April 9, 1929.  A. GRÜNIG  1,708,016
CUTTING IMPLEMENT
Filed Aug. 8, 1927  2 Sheets-Sheet 2
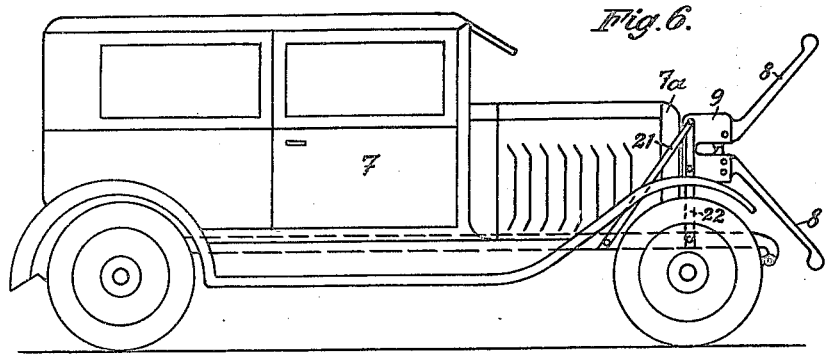
Fig. 6.
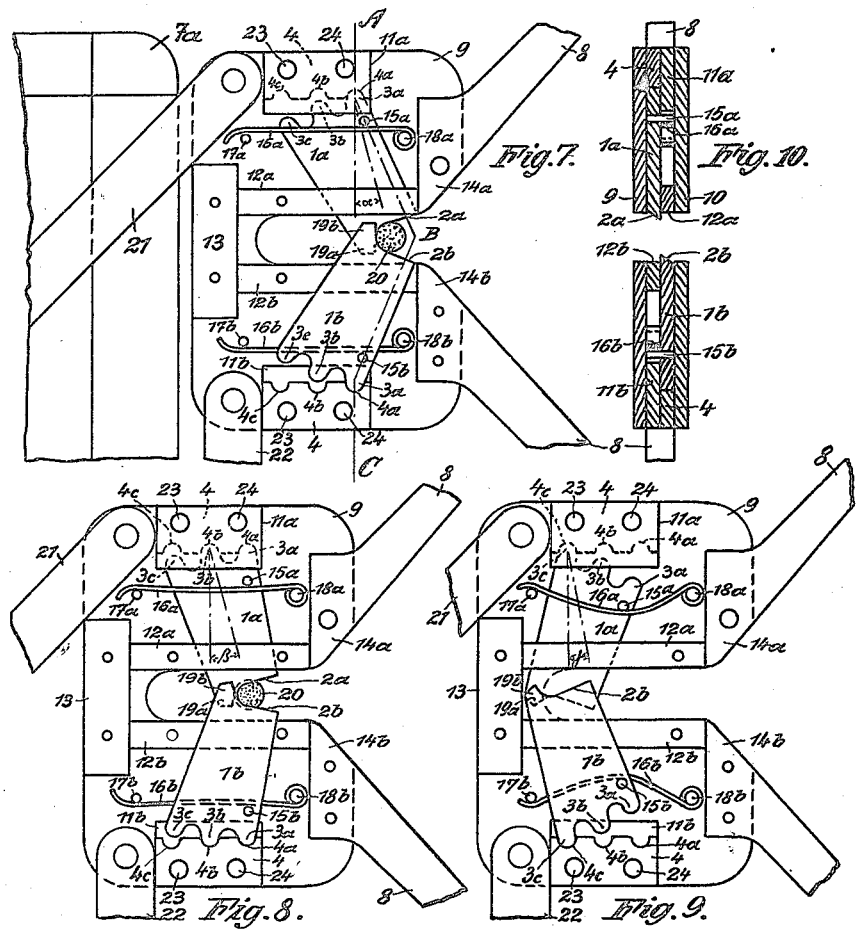
INVENTOR
A. GRÜNIG,
BY
ATTY.

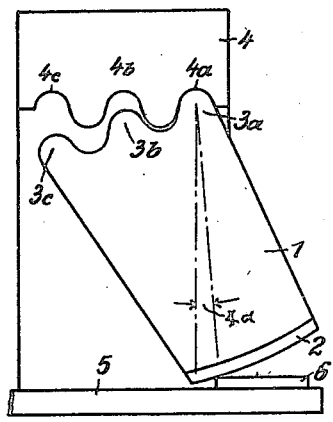
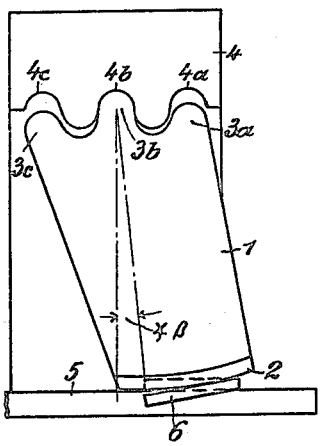
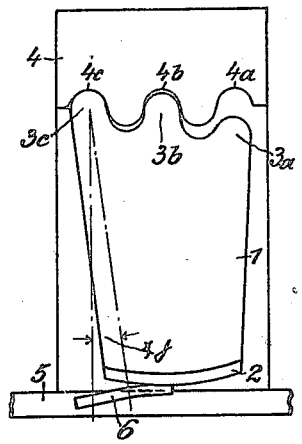
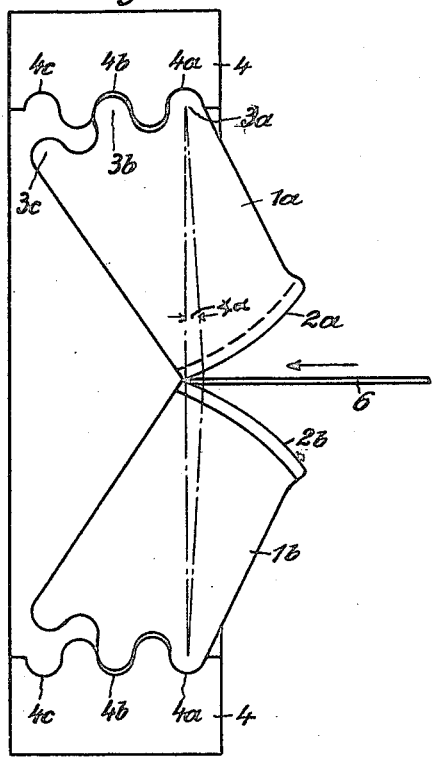
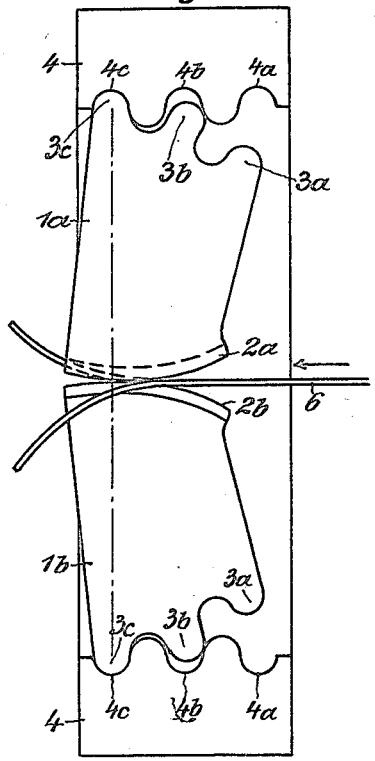

Patented Apr. 9, 1929.

1,708,016

UNITED STATES PATENT OFFICE.

ALBERT GRÜNIG, OF BRESLAU, GERMANY.

CUTTING IMPLEMENT.

Application filed August 8, 1927, Serial No. 211,512, and in Germany May 29, 1926.

This invention relates to a cutting implement involving a lever for cutting, pressing, clamping, jumping and similar tools or machine tools or intended for use in connection with such tools. The object of the invention resides chiefly therein to subdivide the working procedure into several phases so that the power to be applied, and the stress to be caused thereby, is only a part of the power required and the stress caused if that subdivision is not effected.

Another object of the invention consists, especially as regard cutting tools and cutting machine tools, therein to commence all phases or portions of the entire cutting procedure with equally favorable first cuttings in order to obtain the most favorable lever action and effect possible at every phase or portion of that procedure.

Still another object of the invention consists therein to produce a rope cutting device for motor cars and the like which is able to cut through a wire rope or the like stretched across a street or road. This device is so designed that the motor car etc. equipped with it and encountering a transversely stretched rope and cutting it does not experience a detrimentally strong shock, but only a slight and negligible one by reason of the subdivision of the cutting action, as well as of the power applied in effecting it. I am aware of the existence of wire rope cutting devices for the purpose stated, but it is also known to me that the cars concerned experience a very severe shock when the device becomes very suddenly active, and if the rope is somewhat thick the effect of the device is very questionable, if not the reverse of what ought to be.

The invention is illustrated diagrammatically and by way of example on the accompanying drawing on which Figures 1–3 are side-views of one constructional form of a device designed according to this invention in three different positions corresponding to the subdivision of a cutting procedure into three phases or portions, or to these three phases or portions respectively, and Figures 4 and 5 are two side-views of another constructional form in which two cutting members form a kind of scissors, Fig. 4 showing the first of three phases or cutting actions, and Fig. 5 showing the third, the second being omitted. Figure 6 is a side-view of a motor car provided with a rope cutting device designed according to this invention, Figures 7, 8 and 9 show the details of this device, drawn to a greatly enlarged scale relatively to Fig. 6, and Figure 10 is a vertical transverse section in the plane A—B—C of Fig. 7.

In the drawing, 1 (Figs. 1–3) denotes a cutting lever, the lower edge of which is designed as a cutting edge 2, whereas the upper edge is provided with tooth-like projections $3^a$, $3^b$, $3^c$ engaging successively recesses $4^a$ $4^b$ $4^c$ provided in a stationary abutment member 4. In the normal or initial position of the lever 1 its projection $3^a$ engages the recess $4^a$ of the member 4. 6 denotes a work-piece to be cut through. Either this (or any other) work-piece is shoved against the cutting edge 2 of the lever 1, or the lever 1 is shoved towards the work-piece until its cutting-edge 2 contacts with the same. The work-piece 6 is supported upon a table 5 and the portion to be cut off projects over the respective rim of that table. When then the work-piece 6 is moved to the left or the lever 1 to the right the projection $3^a$ will leave the recess $4^a$ and the projection $3^b$ will enter into the recess $4^b$ (Fig. 2). When the parts have arrived in the position Fig. 2 about one third of the cutting operation has been completed, a subsequent third of such operation being completed while the projection $3^b$ of the lever is in cooperation with the recess $4^b$ of the member 4, the final third of the cutting operation being completed during cooperation of the projection $3^c$ of the lever and the recess $4^c$ of the member 4. In the position Fig. 3 of the parts the cutting operation is nearly completed. The cutting operation is obviously subdivided into a plurality of phases, the number of which depends upon the number of the projections or teeth of the lever 1 and the recesses or gaps of the member 4. It is a matter of course, that not only said projections or teeth enter into said recesses or gaps, but that also the projections or teeth of the member 4 enter into the recesses or gaps of the member 1. At any rate, the power applied is subdivided according to the number of the supporting points provided at the member 1, or at the member 4 respectively, and the stress to which these members are subjected is subdivided correspondingly.

The levers may be arranged in pairs, as in Figs. 4 and 5, in such a manner, that the two cutting members pertaining to a pair form a kind of scissors. In these Figs. (4 and 5) similar numerals of reference denote similar parts as in Figs. 1–3, except the numerals $1^a$ and 1$^b$ which denote the cutting members of the two levers, and 2$^a$ and 2$^b$ which denote the cutting edges of said members. The manner of co-operation of each cutting member with the work-piece 6 is the same as in Figs. 1–3, but a separate supporting table for the work-piece is dispensed with for obvious reasons. The shape of the cutting edges is preferably such that the angle existing between said edges and the work-piece when the cutting commences is only small and always of the same size.

Cutting levers designed according to this invention are particularly suited for use in connection with motor-cars to cut through a rope stretched across the street or road for criminal reasons, as pointed to already in the introductory part of this specification. Fig. 6 shows a motor car 7 equipped in this manner. The rope intercepting, guiding and cutting device 8, 9 (8 being rope intercepting and guiding arms, and 9 the body or casing enclosing the levers with their cutting edges and some other parts hereinafter described) is arranged in front of the radiator 7$^a$ and supported by rods 21 and 22 affixed to the underframe of the car. The details are shown in Figs. 7–10. There is also in this case a pair of movable members 1$^a$ and 1$^b$ co-operating with stationary members 4, just as in Figs. 4 and 5. The body of the device consists of two vertical plates 9 and 10 (Fig. 10) which are kept remote from one another by intermediate iron pieces 11$^a$ and 11$^b$ (11$^a$ being located side by side with the upper member 4, and 11$^b$ side by side with the lower member 4), 12$^a$ and 12$^b$, 13 and 14$^a$ and 14$^b$ (these latter two pieces being made integral with the arms 8). The upper arm 8 may be so attached to the body of the device that it can be turned down when there is no danger of encountering a stretched rope, as for instance at day-time or on a street or road where there are no trees at the sides thereof.

The body plates 9 and 10 enclose a space in which the movable members 1$^a$ and 1$^b$ of the levers are housed, more precisely, are so housed that they can be moved only in their planes. The cutting member 1$^a$ is located at the side of the body plate 9, the cutting member 1$^b$ at the side of the body plate 10 (Fig. 10). The cutting member 1$^a$ is, furthermore, provided with a pin 15$^a$ contacting with a flat spring 16$^a$ attached at one of its ends to a pin 18$^a$ and resting at its other end upon a pin 17$^a$. In the same manner the cutting member 1$^b$ is provided with a pin 15$^b$ contacting with a flat spring 16$^b$ attached at one of its ends to a pin 18$^b$ and resting at its other end upon a pin 17$^b$.

The shape of the cutting edges 2$^a$ and 2$^b$ differs from Figs. 1–5 by reason of the particular purpose of the device in question, and the rear portions of the cutting members overlap one another with lugs 19$^a$ and 19$^b$, these lugs forming abutments for the rope encountered, as in Figs. 7 and 8 in which 20 denotes the rope. Fig. 7 shows the movable parts in their position of rest in which they are held by the springs 16$^a$ and 16$^b$ and the pins 15$^a$ and 15$^b$. The position of the cutting members 1$^a$ and 1$^b$ relatively to the stationary members 4 is the same as in Fig. 4. When the cutting members encounter a rope, as in Fig. 7, and are turned rearwardly by the same, the rope being now cut through, the stationary intermediate part 13 of the body of the device acts as an abutment member for the cutting members, as in Fig. 9. Fig. 8 shows an intermediate position.

The stationary members 4 are connected with the body plates by detachable bolts 23 and 24. When the cutting edges 2$^a$ and 2$^b$ require sharpening, the bolts 23 and 24 are detached, as are then also the members 4, as well as 1$^a$ and 1$^b$.

Owing to the existence of three projections or teeth 3$^a$, 3$^b$, 3$^c$ (as also in Figs. 1–5), the cutting of the rope proceeds in three consecutive phases following one another without any interruption. The three paths of the cutting members are indicated by the angles $\alpha$, $\beta$ and $\gamma$ in Figs. 7–9. The same angles are indicated in Figs. 1–3, and the angle $\alpha$ is indicated in Fig. 4. While the cutting members are moved rearwardly as much as corresponds to the angle $\alpha$, the rope is cut through partly; another part of the rope is cut through while the cutting member pass through the angle $\beta$, and the rest is cut through while they pass through the angle $\gamma$. All this applies to Figs. 1–3.

I wish it to be understood that the invention is not limited to cutting devices, but can be usefully employed wherever a pressure is to be exerted. The invention can be used in connection with punches, presses, clamping couplings, clamping devices, and the like, and the number of the supporting points (3$^a$, 4$^a$, 3$^b$, 4$^b$, 3$^c$, 4$^c$) is by no means limited to three at each member, but there may either be only two, or four or more than four, just as best suited in the particular case, the power applied being always correspondingly subdivided.

I claim:

1. A cutting implement including a cutting lever formed with a cutting edge, that end of the lever remote from the cutting edge being constructed to provide a plurality of spaced fulcrum points successively functioning as the lever is moved in cutting direction, a fixed member formed with recesses to successively receive the fulcrum points of the lever, the co-operation of the successive fulcrum points with the recesses varying the leverage to reduce the power required for the cutting stroke as compared with a single fulcrum point for the lever, and means cooperating with the cutting edge of the lever to cause the material to be cut to be operatively engaged by said edge.

2. A cutting implement including a plurality of cutting levers having their proximate edges formed for cooperation in cutting, the remote edges of the respective levers presenting a plurality of spaced projections, and fixed means to successively receive the spaced projections of the levers during the cutting operation to permit each of said projections to form a fulcrum for its lever for a portion only of the cutting strokes of such levers.

3. A pair of levers on opposite sides of a common plane and the outer end of each lever being so designed as to present several supporting points adapted to become active one after the other, an abutment for the outer ends of said levers, the edges of the adjacent ends of said levers being designed as cutting edges adapted to cooperate, a lateral projection on each lever, spring so arranged with respect to said projections as to hold open the scissors formed by said cutting edges, and means for holding the springs in position.

In testimony whereof I affix my signature.

DR. ALBERT GRÜNIG.